United States Patent [19]

Haarstad

[11] Patent Number: 4,759,182
[45] Date of Patent: Jul. 26, 1988

[54] STEERING CONTROL UNIT WITH FLOW AMPLIFICATION

[75] Inventor: Donald M. Haarstad, Chaska, Minn.

[73] Assignee: Eaton Corporation, Cleveland, Ohio

[21] Appl. No.: 77,264

[22] Filed: Jul. 24, 1987

[51] Int. Cl.[4] .......................... F01C 1/10; F62D 5/08
[52] U.S. Cl. .......................................... 60/384; 91/467; 137/596; 137/596.13; 137/625.21; 180/132
[58] Field of Search .......................... 60/384; 91/467; 180/132; 137/625.21, 596, 596.13

[56] References Cited

U.S. PATENT DOCUMENTS

| 3,564,848 | 2/1971 | Baatrup et al. | 60/384 |
|---|---|---|---|
| 3,584,537 | 6/1971 | Schulz | 60/384 X |
| 4,052,929 | 10/1977 | Baatrup et al. | 91/29 |
| 4,096,883 | 6/1978 | Yip | 137/596.13 |
| 4,167,893 | 7/1979 | Johnson | 91/446 |
| 4,556,272 | 1/1986 | Petersen et al. | 60/384 |

*Primary Examiner*—Edward K. Look
*Attorney, Agent, or Firm*—L. J. Kasper

[57] ABSTRACT

A fluid controller (17) is disclosed for controlling the flow of fluid to a steering cylinder (19). The controller includes a fluid meter (51) and a valving arrangement (49) including a valve spool (65) and a sleeve (67), which define a main fluid path including a main variable flow control orifice (121), the fluid meter (51), a variable flow control orifice (123), the steering cylinder (19), and a variable flow control orifice (125). In accordance with the invention, the spool and sleeve define an amplification fluid path including a variable amplification orifice (129) in parallel with the main fluid path, and disposed to amplify the flow of fluid through the meter. In one embodiment of the invention, the amplification fluid path communicates with the main fluid path upstream of the main variable flow control orifice, and at a location downstream of the fluid meter, but upstream of the variable flow control orifice (123). The amplification fluid path provides an amplification ratio which can be made to vary, in any desired manner, as a function of valving displacement.

18 Claims, 7 Drawing Sheets

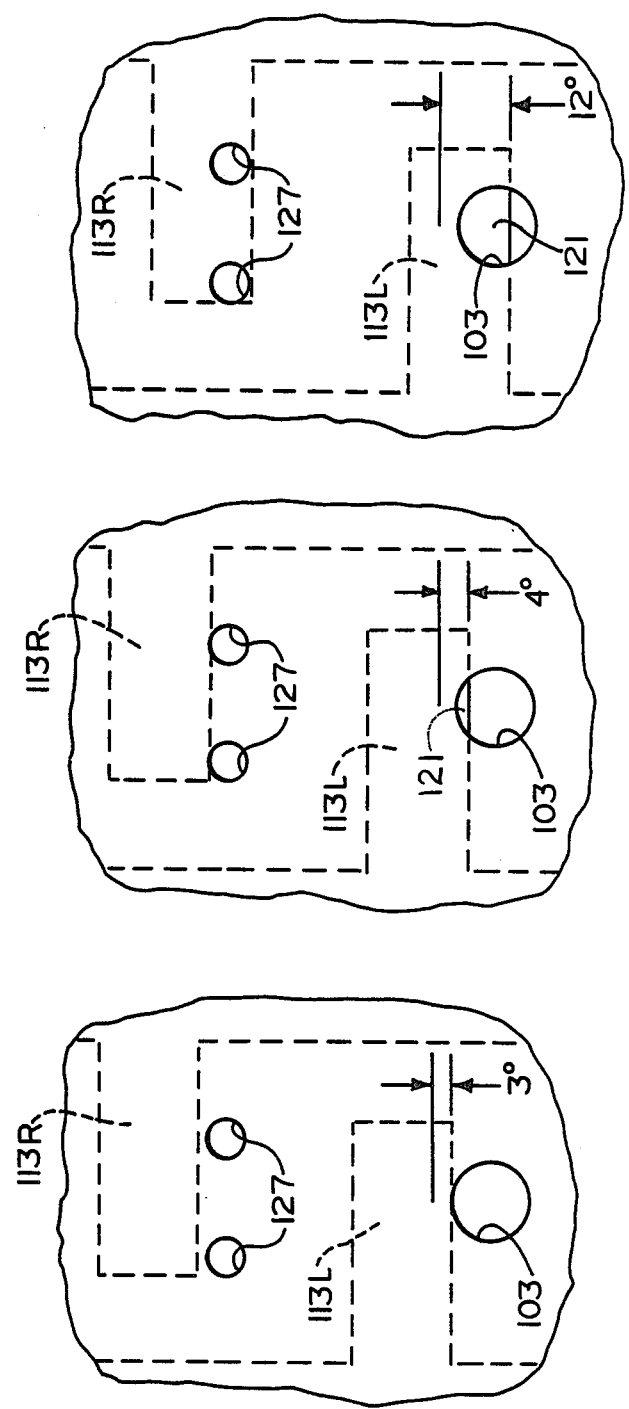

STEERING CONTROL UNIT WITH FLOW AMPLIFICATION

BACKGROUND OF THE DISCLOSURE

The present invention relates to fluid controllers of the type used to control the flow of fluid from the source of pressurized fluid to a fluid pressure operated device, such as a steering cylinder.

A typical fluid controller of the type to which the present invention relates includes a housing which defines various fluid ports, and further includes a fluid meter and valving, and an arrangement for imparting follow-up movement to the valving in response to flow through the fluid meter. The flow through the controller valving is directly proportional to the area of the main variable flow control orifice, which, in turn, is proportional to the rate at which the steering wheel is rotated. Furthermore, the area of the main variable flow control orifice has a known relationship to the displacement of the controller valving.

Fluid controllers of the type to which the invention relates are frequently used on large, heavy vehicles, such as loaders, backhoes, and various other construction vehicles. Steering such a vehicle requires a relatively large flow of fluid through the controller to the steering cylinder per revolution of the steering wheel. However, because typical prior art controllers have been designed such that all flow to the cylinder must first pass through the fluid meter, controllers for large vehicles have required fluid meters with relatively large displacements. Such large displacement fluid meters add substantially to the size and cost of the controller.

Therefore, it has long been an object of those skilled in the art to provide a steering system, including a fluid controller, in which the total flow through the steering system is substantially greater than the flow through the controller, but with the overall system flow being related to the flow through the controller in a known manner. See for example U.S. Pat. No. 4,052,929 in which the controller receives fluid from one pump and generates a pilot signal to control a pilot operated valve which receives fluid from a second pump. The total steering flow comprises the flow through the pilot operated valve plus the flow from the controller. Such a system is theoretically satisfactory, but the cost of such a system becomes nearly prohibitive because of the addition of the pilot operated valve and the second pump.

More recently, there has been an attempt to provide a flow to the steering cylinder which is greater than the flow through the fluid meter by having the full amount of desired steering flow enter the controller, with one portion flowing through the controller valving and fluid meter in the normal manner, and the remainder of the fluid flowing through a pressure regulating device and a bypass throttle. These two portions of fluid recombine within the controller and flow to the steering cylinder. See U.S. Pat. No. 4,566,272. It is possible that the performance of a controller made in accordance with U.S. Pat. No. 4,566,272 would be satisfactory, however, the addition of a pressure regulating valve within the controller, and the associated structure would still add substantially to the cost of the controller, and in many applications would require substantial redesign of at least the controller housing in order to accommodate the addition of such a valve.

In vehicle applications in which provision has been made for a very large steering flow, an additional problem has arisen. Typically, the full system flow (i.e., the displacement of the fluid meter), is available upon initiation of steering action. The result is that there is sufficient steering flow at higher valving displacements to achieve a satisfactory number of steering wheel turns, lock-to-lock. However, at relatively smaller valve displacements, such as for small steering corrections, there is too much flow, and the steering appears too responsive to the vehicle operator.

SUMMARY OF THE INVENTION

Accordingly, it is an object of the present invention to provide an improved steering system and fluid controller, wherein the controller has the capability of providing a steering flow which is substantially larger than the flow through the fluid meter of the controller, without the need for additional valves and other components.

It is another object of the present invention to provide an improved fluid controller which accomplishes the above-identified object, and in addition, has the capability of different steering ratios (ratio of steering flow to steering wheel revolutions) for different steering conditions.

The above and other objects of the present invention are accomplished by providing an improved controller of the type including housing means defining an inlet port for connection to the source of pressurized fluid, a return port for connection to a reservoir, and first and second control fluid ports for connection to the fluid pressure operated device. Valve means is disposed in the housing means and defines a neutral position and a first operating position. The housing means and the valve means cooperate to define a main fluid path communicating between the inlet port and the first control fluid port, and between the second control fluid port and the return port when the valve means is in the first operating position. A fluid actuated means imparts follow-up movement to the valve means, proportional to the volume of fluid flow through the fluid actuated means, which is disposed in series flow relationship in the main fluid path, between the inlet port and the first control fluid port. The main fluid path includes a first variable flow control orifice disposed between the inlet port and the fluid actuated means, and having its minimum flow area when the valve means is in the neutral position, and an increasing flow area as the valve means is displaced from the neutral position toward the first operating position. The main fluid path includes a second variable flow control orifice disposed between the fluid actuated means and the first control fluid port.

The improved controller is characterized by the housing means and the valve means cooperating to define an amplification fluid path, in parallel with the main fluid path. The amplification fluid path is in communication with the main fluid path at a first location disposed between the fluid inlet port and the first variable flow control orifice, and at a second location disposed between the fluid actuated means and the first control fluid port. The amplification fluid path includes a variable amplification orifice having its minimum flow area when the valve means is in the neutral position, and an increasing flow area as the valve means is displaced from the neutral position toward the first operating position. The main variable flow control orifice begins to open at least as soon as the variable amplification orifice, as the valve means moves from the neutral position toward the first operating position.

The improved controller is further characterized by the valve means comprising a primary, rotatable valve member and a cooperating, relatively rotatable valve member, and the amplification fluid path and variable amplification orifice being wholly defined by the primary and follow-up valve members.

BRIEF DESCRIPTION OF THE DRAWINGS

FIGS. 5-7 are enlarged, fragmentary overlay views, similar to FIG. 4, but with the valving displaced from the neutral position.

DESCRIPTION OF THE PREFERRED EMBODIMENTS

Figure 1:
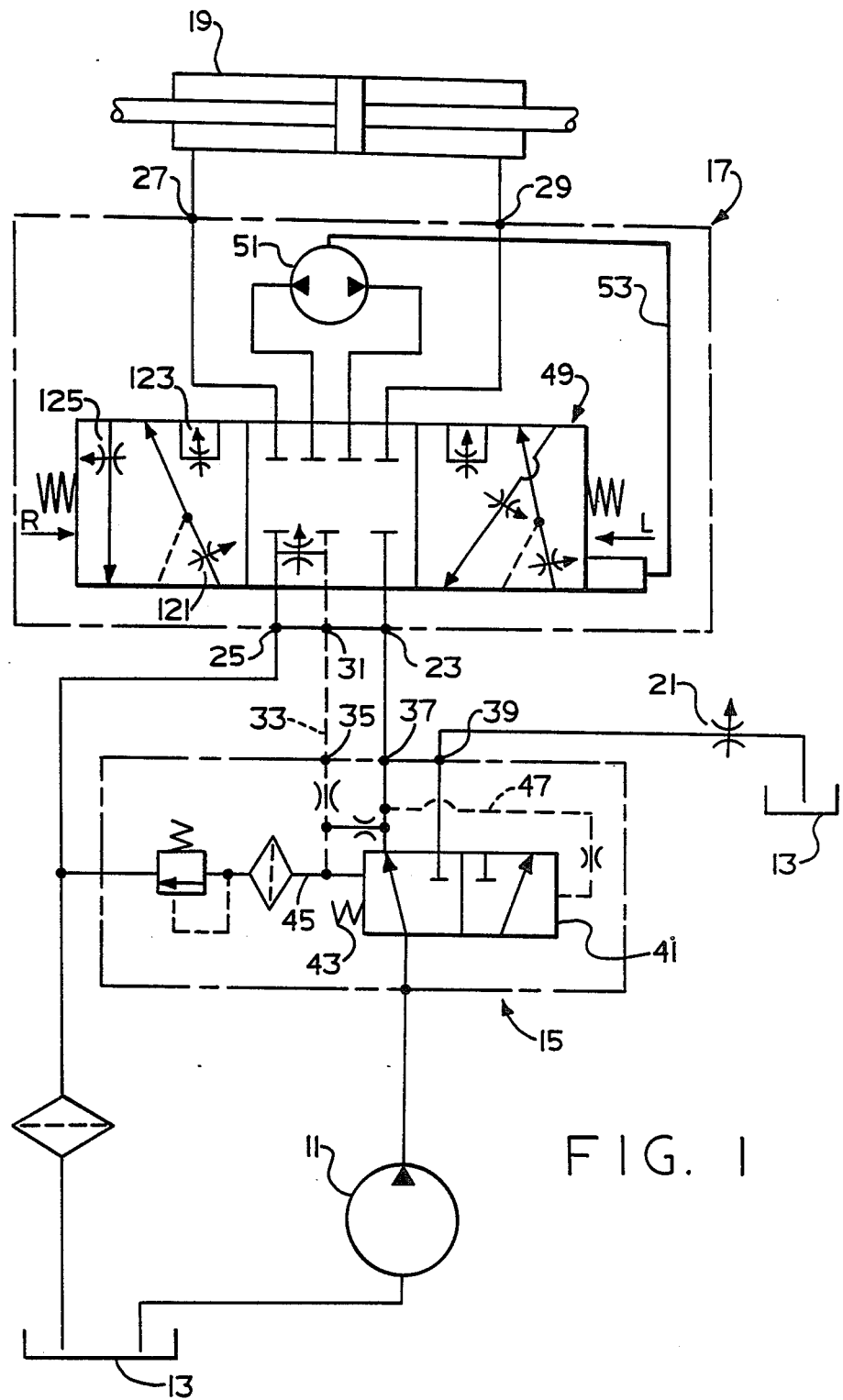
FIG. 1 is a hydraulic schematic of a load sensing, hydrostatic power steering system of the type with which the present invention may be utilized.

Referring now to the drawings, which are not intended to limit the invention, FIG. 1 is a hydraulic schematic of a vehicle hydrostatic steering system including a fluid controller made in accordance with the teachings of the present invention. The system includes a fluid pump 11, shown herein as a fixed displacement pump, having its inlet connected to a system reservoir 13. The system also includes a pilotoperated, load sensing priority flow control valve, generally designated 15. The control valve 15 apportions the flow of fluid from the pump 11 between (1) a primary circuit including a fluid controller, generally designated 17, and a fluid operated steering cylinder 19; and (2) an open-center auxiliary circuit, represented by a variable orifice designated 21.

Referring still to FIG. 1 the fluid controller 17 includes an inlet port 23, a return port 25, and a pair of control (cylinder) fluid ports 27 and 29 which are connected to the opposite ends of the steering cylinder 19. The fluid controller 17 further includes a load signal port 31, which is connected to a load signal line 33 which, in turn, is connected to a load signal port 35 of the priority valve 15, as is well known in the art.

The priority flow control valve 15 may be of the type illustrated in U.S. Pat. No. 3,455,210, assigned to the assignee of the present invention, and incorporated herein by reference. The priority valve 15 includes a priority outlet port 37 which is connected to the inlet port 23 of the controller 17, and an excess flow outlet port 39 which is connected to the auxiliary circuit 21. The priority valve 15 includes a valve spool 41 which is biased by a spring 43 toward a position permitting substantially all inlet fluid to flow to the priority outlet port 37. The spring 43 is aided by the pressure in a signal line 45 communicating between the load signal port 35 and the end of the valve spool 41. In opposition to these biasing forces is the pressure exerted by a pilot signal 47, communicated from upstream of the priority outlet port 37 to the opposite end of the valve spool 41. The general structure and operation of the priority valve 15 are well known in the art, and because they form no direct part of the present invention, they will not be described further herein.

The fluid controller 17, which will be described in greater detail in conjunction with FIG. 2, may be of the general type illustrated and described in U.S. Pat. No. Re. 25,126, and in the subject embodiment, is more specifically of the type illustrated and described in U.S. Pat. No. 4,109,679, both of which are assigned to the assignee of the present invention and incorporated herein by reference. Disposed within the fluid controller 17 is a valving arrangement, generally designated 49, which is movable from its neutral position shown in FIG. 1 to either a right turn position R or a left turn position L. When the valving arrangement 49 is in either of the turn positions, the pressurized fluid passing through the valving 49 flows through a fluid meter 51, one function of which is to measure (meter) the proper amount of fluid to be communicated to the appropriate control port 27 or 29. As is well known to those skilled in the art, the other function of the fluid meter 51 is to provide follow-up movement to the valving 49, such that the valving 49 is returned to its neutral position after the desired amount of fluid has been communicated to the steering cylinder 19. In FIG. 1, this follow-up movement is achieved by means of a mechanical follow-up connection, indicated schematically at 53.

As may best be seen schematically in FIG. 1, the valving arrangement 49 defines a plurality of variable orifices whenever the valving 49 is moved from its neutral position to one of its operating positions, either a right turn position R or a left turn position L. These variable orifices will be described in greater detail subsequently, in conjunction with the detailed description of FIGS. 3 and 4.

FLUID CONTROLLER 17

Figure 2:
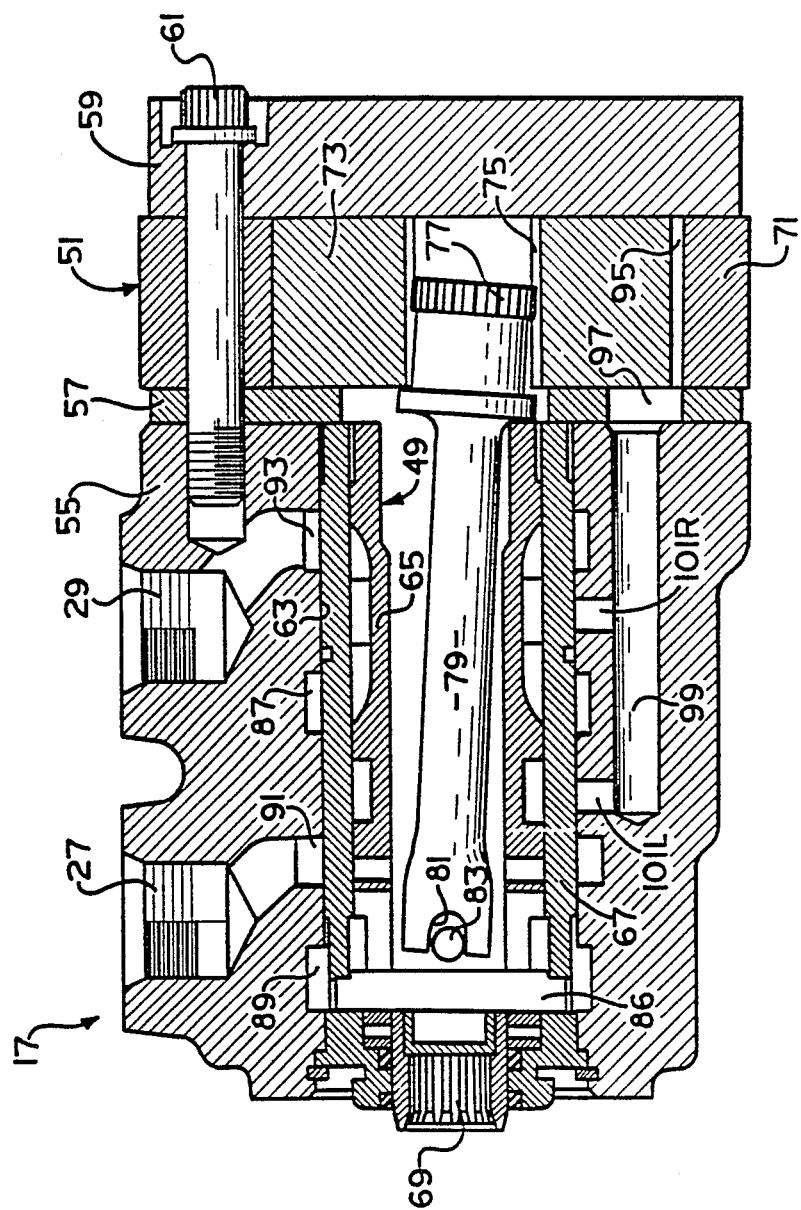
FIG. 2 is an axial cross-section of a fluid controller of the type to which the present invention relates.

Referring now to FIG. 2, the construction of the fluid controller 17 will be described in some detail. The fluid controller 17 comprises several sections, including a housing section 55, a port plate 57, a section comprising the fluid meter 51, and an end plate 59. These sections are held together in tight sealing engagement by means of a plurality of bolts 61 which are in threaded engagement with the housing section 55. The housing section 55 defines the inlet port 23, and return port 25, (not shown in FIG. 2) and the control ports 27 and 29.

Rotatably disposed within a valve bore 63 defined by the housing section 55 is the valving arrangement 49 which is shown schematically in FIG. 1. The valving 49 comprises a primary, rotatable valve member 65 (hereinafter referred to as the "spool"), and a cooperating, relatively rotatable follow-up valve member 67 (hereinafter referred to as the "sleeve"). At the forward end of the spool 65 is a portion having a reduced diameter and defining a set of internal splines 69 which provide for a direct mechanical connection between the spool 65 and a steering wheel (not shown). The spool 65 and sleeve 67 will be described in greater detail subsequently.

The fluid meter 51 may be of the type well known in the art, and includes an internally-toothed ring 71, and an externally-toothed star 73. The star 73 defines a set of internal splines 75, and in splined engagement therewith is a set of external splines 77 formed at the rearward end of a drive shaft 79. The drive shaft 79 has a bifurcated forward end 81 permitting driving connection between the shaft 79 and the sleeve 67, by means of a pin 83 passing through a pair of pin openings 85 (see FIG. 4, not shown in FIG. 2) in the spool 65. Thus, pressurized fluid flowing through the valving 49 in response to rotation of the spool 65 flows through the fluid meter 51, causing orbital and rotational movement of the star 73 within the ring 71. Such movement of the star 73 causes follow-up movement of the sleeve 67, by means of the drive shaft 79 and pin 83 (which comprise the follow-up connection 53 of FIG. 1), to maintain a particular relative displacement between the spool 65 and sleeve 67, proportional to the rate of rotation of the steering wheel. A plurality of leaf springs 86 extend through an opening in the spool 65, biasing the sleeve 67 toward the neutral position, relative to the spool 65.

Referring still to FIG. 2, it may be seen that the housing section 55 defines four annular chambers surrounding the valving 49, to provide fluid communication between the valving 49 and the various ports. An annular chamber 87 receives pressurized fluid from the inlet port 23, while an annular chamber 89 communicates return fluid to the return port 25. In addition, an annular chamber 91 provides communication between the valving 49 and the control port 27 while an annular chamber 93 provides communication between the valving 49 and the control port 29.

The toothed interaction of the star 73, orbiting and rotating within the ring 71, defines a plurality of expanding and contracting fluid volume chambers 95, and adjacent each chamber 95, the port plate 57 defines a fluid port 97. The housing section 55 defines a plurality of axial bores 99 (only one of which is shown in FIG. 2), each of which is in open communication with one of the fluid ports 97. The housing section 55 further defines a pair of radial bores 101 L and 101 R providing communication between each of the axial bores 99 and the valve bore 63, as will be described in greater detail subsequently.

VALVING ARRANGEMENT 49

Figure 4:
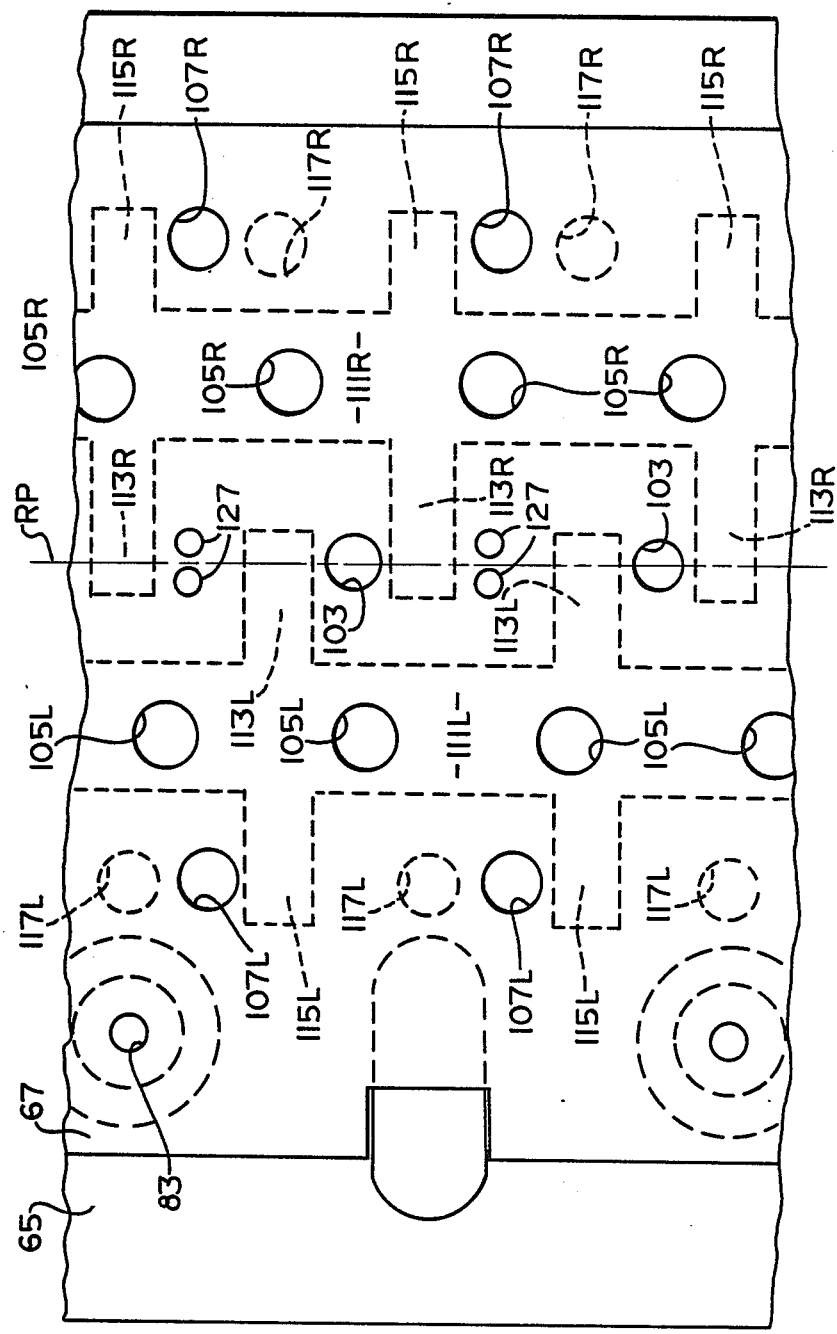
FIG. 4 is an overlay view of the valving used in the fluid controller shown in FIG. 2, with the valving in the neutral position, but on a larger scale than in FIG. 2.

Referring now primarily to FIG. 4, the spool 65 and sleeve 67 will be described in greater detail. In connection with the subsequent description, it should be noted that many of the ports and passages are arranged symmetrically with respect to a central reference plane RP, and such elements will be described by a reference numeral followed by either an R or an L to indicate that the element is located on either the right side or the left side, respectively of the reference plane RP. On the other hand, certain of the elements do not have a corresponding element oppositely disposed about the reference plane RP and will be referred to by use of a reference numeral alone. Furthermore, it should be understood that the overlay view in FIG. 4 is intended to illustrate only the interface between the spool 65 and sleeve 67, and as a result, does not show the various annular chambers 87 through 93 defined by the housing section 55.

The sleeve 67 defines a plurality of pressure ports 103, which are disposed to be in continuous fluid communication with the inlet port 23 by means of the annular chamber 87. Equally and oppositely disposed about the reference plane RP is a plurality of meter ports 105 L, and a plurality of meter ports 105 R. The meter ports 105 L are disposed for commutating fluid communication with the radial bores 101 L, while the meter ports 105 R are disposed for commutating fluid communication with the radial bores 101 R. Equally and oppositely disposed about the reference plane RP, and further therefrom than the meter ports 105 L and 105 R, respectively, is a plurality of operating ports 107 L, and a plurality of operating ports 107 R, Referring still to FIG. 4, the spool 65 defines a pair of circumferential meter grooves 111 L and 111 R, equally and oppositely disposed about the reference plane RP, and disposed to be axially aligned with the meter ports 105 L and 105 R, respectively. In fluid communication with the meter groove 111 L is a plurality of pressure passages 113 L and in fluid communication with the meter groove 111 R is a plurality of pressure passages 113 R. Also in fluid communication with the meter groove 111 L is a plurality of operating passages 115 L, and in fluid communication with the meter groove 111 R is a plurality of operating passages 115 R. In addition to the above-described grooves and passages which are formed on the outer surface of the spool 65, the spool 65 defines a plurality of tank ports 117 L, alternately disposed between operating passages 115 L, and a plurality of tank ports 117 R, alternately disposed between operating passages 115 R. The tank ports 117 L and 117 R are in fluid communication with the interior of the valve spool 65 so that return fluid passes through the interior of the spool 65 and radially outward through the spring openings into the annular chamber 89 which communicates with the return port 25.

OPERATION OF VALVING

It is believed that the basic operation of the fluid controller 17 and valving arrangement 49 described thus far should be readily apparent in view of the teachings of above-incorporated U.S. Pat. No. 4,109,679. However, the operation of the controller and valving will be described briefly, partly to relate the structure illustrated in FIGS. 2 and 4 to the schematic of FIG. 1.

Referring still to FIG. 4, when the valving 49 is in the neutral position (no rotation of the steering wheel), pressurized fluid is communicated from the inlet port 23 to the annular chamber 87, and then through the pressure ports 103. However, with the valving in the neutral position, flow through the pressure ports 103 is blocked by the outer surface of the spool 65, and there is no fluid flow through the valving 49 and fluid meter 51. Therefore, in the subject embodiment, the valving 49 is of the type referred to as "closed-center", although it will be apparent to those skilled in the art that the invention is not limited to closed-center valving. Furthermore, the fluid controller 17 was described previously in connection with FIG. 1 as being load sensing, although the particular structure by which the valving arrangement 49 is able to communicate a load signal port 31 forms no part of the present invention, and is not illustrated or described herein.

When the steering wheel is rotated at a particular speed of rotation, the spool 65 is displaced, relative to the sleeve 67, by a particular rotational displacement which corresponds to the speed of rotation of the steering wheel. Thereafter, with continued rotation of the wheel, the fluid flowing through the fluid meter 51 results in follow-up movement of the sleeve 67 to maintain the particular rotational displacement.

FIG. 6 illustrates the valve spool 65 being displaced, relative to the sleeve 67, which corresponds to moving the valve arrangement 49 of FIG. 1 to the right turn position R. With the spool 65 displaced, pressurized fluid is able to flow from the pressure ports 103 into the respective pressure passages 113 L, the area of overlap therebetween cumulatively comprising a main variable flow control orifice 121 (see FIGS. 1 and 6) which is commonly referred to as the $A_1$ orifice. Referring again primarily to FIG. 4, pressurized fluid flows from each of the pressure passages 113 L into the annular meter groove 111 L, then radially outward through the meter ports 105 L which are in commutating fluid communication with the radial bores 101 L, as was described previously. This pressurized, unmetered fluid is then communicated to the fluid meter 51 through certain of the axial bores 99, then returns from the fluid meter 51 through certain other of the axial bores 99 as pressurized, metered fluid. The metered fluid then flows through the radial bores 101 R which are in commutating fluid communication with the meter ports 105 R. Metered fluid flowing through the meter ports 105 R enters the annular meter groove 111 R, then flows into the operating passages 115 R, then flows through the respective operating ports 107 R. The overlap therebetween cumulatively comprises a variable flow control orifice 123 (see FIG. 1) which is commonly referred to as the $A_4$ orifice.

Fluid flowing through the operating ports 107 R enters the annular chamber 93, then flows to the control port 29, then to the right end of the steering cylinder 19. Fluid which is exhausted from the left end of the steering cylinder 19 is communicated through the control port 27 to the annular chamber 91, then through the operating ports 107 L, and through the tank ports 117 L, the area of overlap therebetween cumulatively comprising a variable flow control orifice 125 (see FIG. 1), which is commonly referred to as the $A_5$ orifice. As was described previously, return fluid which flows through the tank ports 117 L then flows through the interior of the spool 65, then radially outward through the pin openings 85 to the annular chamber 89, from where fluid flows to the return port 25, and then to the system reservoir 13. The flow path described above will be referred to hereinafter as the "main fluid path", and it should be noted by reference to FIG. 1 that the load signal port 31 communicates with the main fluid path at a location immediately downstream from the main variable flow control orifice 121. It should be apparent that, if the spool is displaced, relative to the sleeve, in the opposite direction, so that the valving 49 is in the left turn position L, the flow through the valving 49 will be in the "opposite" direction, as that term will be understood from a reading and understanding of above-incorporated U.S. Pat. No. 4,109,679.

AMPLIFICATION FLUID PATH

Referring now primarily to FIG. 4, the added elements which provide for the dampening fluid path of the present invention will be described. It should be noted that all of the elements described up to this point are elements which are already known, and have been illustrated and described in above-incorporated U.S. Pat. No. 4,109,679. The sleeve 67 defines two pairs of amplification bores 127, with the bores 127 in each pair being centered with respect to the central reference plane, as shown in FIG. 4.

Referring now to FIG. 4, in conjunction with the flow diagram of FIG. 3, the operation of the present invention will be described generally. pressurized fluid in the annular chamber 87 is present in the bores 127, but communication therethrough is blocked by the outer surface of the spool 65, just as communication through the pressure ports 103 is blocked by the outer surface of the spool 65, when the valving is in neutral. As the spool 65 is displaced, relative to the sleeve 67, eventually pressurized fluid is able to flow through the amplification bores 127 into the adjacent pressure passages 113R, the area of overlap therebetween cumulatively comprising a variable amplification orifice 129 (see FIG. 3) which may also be referred to as the $A_4$ orifice. The pressurized fluid flowing through the amplification orifice 129 flows from the pressure passages 113R into the annular meter groove 111R, there combining with the fluid which has passed through the fluid meter 51 and through the meter ports 105R. This combined quantity of fluid then flows into the operating passages 115R, and then through the operating ports 107R, as described previously.

Figure 3:
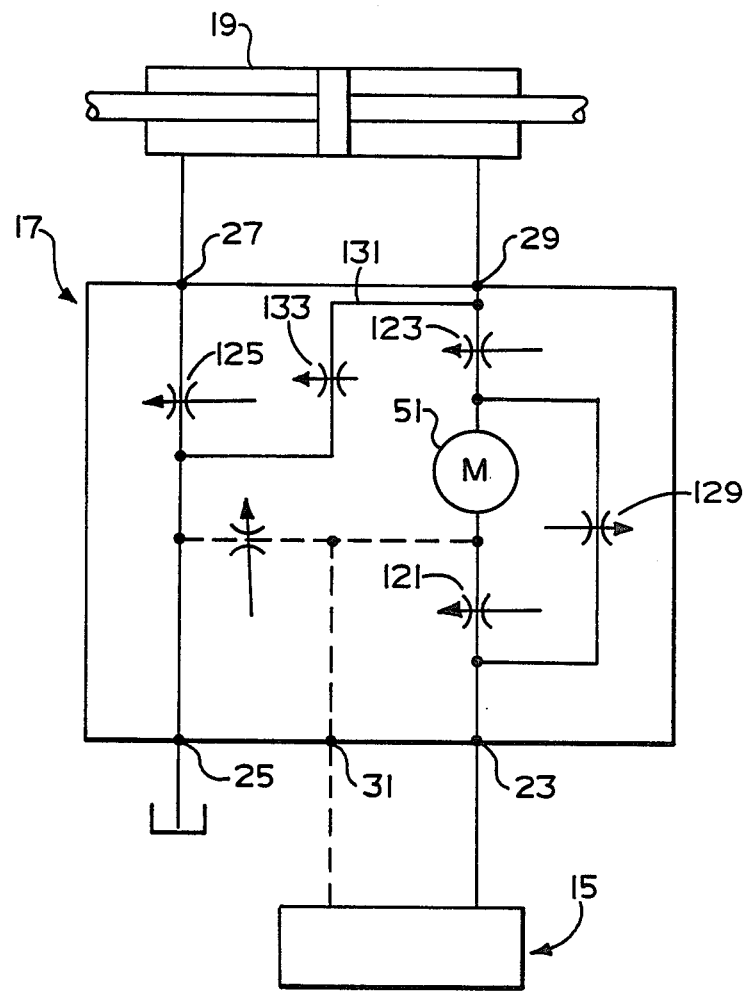
FIG. 3 is a unidirectional flow diagram illustrating the fluid controller shown schematically in FIG. 1, as well as the various orifices shown in FIG. 1, and including the teachings of the present invention.

Referring now primarily to FIG. 3, the amplification fluid path described above is, in the subject embodiment, in communication with the main fluid path at a location upstream of the main variable flow control orifice 121. The fluid flowing through the amplification fluid path, and through the variable amplification orifice 129 then recombines with the main fluid path at a location upstream of the variable flow control orifice 123. It will be understood by those skilled in the art that, when practicing the present invention, it would be necessary to increase the flow capacity of the variable orifice 123 to accommodate the total flow through both the main fluid path and the amplification fluid path.

Referring still to FIG. 3, several possible applications for the present invention will be described. Shown schematically in FIG. 3 is a dampening fluid path 131, including a variable dampening orifice 133. The path 131 is connected to the main fluid path at a location downstream of the variable orifice 123, and is able to communicate a small amount of dampening fluid, through the variable dampening orifice 133, to the return side of the main fluid path, downstream of the variable flow control orifice 125. A more detailed description of the construction and operation of the dampening fluid path 131 is provided in copending application U.S. Ser. No. 37,493, filed Apr. 13, 1987, in the name of Donald M. Haarstad and Douglas M. Gage, for an Improved Fluid Controller and Dampening Fluid Path.

The dampening fluid path 131 has been found to be effective for cushioning or dampening pressure pulses and spikes in the lines between the controller 17 and the steering cylinder 19. However, the flow through the dampening fluid path 131 does represent a loss from the system, thus decreasing the flow to the steering cylinder 19, and increasing the number of turns of the steering wheel lock to lock. Therefore, one application of the present invention is to size the variable amplification orifice 129 to be approximately equal to the variable dampening orifice 133, such that the quantity of amplification fluid which bypasses the fluid meter 51 is approximately equal to the amount of dampening fluid, and the net flow of fluid to the steering cylinder 19 will be the same as the flow through the meter 51.

Alternatively, another application for the present invention is to provide true flow amplification, such that whether or not the controller 17 includes a dampening fluid path 131, the variable amplification orifice 129 is sized such that the net flow to the steering cylinder 19 is substantially greater than the flow through the fluid meter 51. The amplification aspect of the present invention will be described subsequently in connection the graphs in FIGS. 9 and 10.

Figure 9:
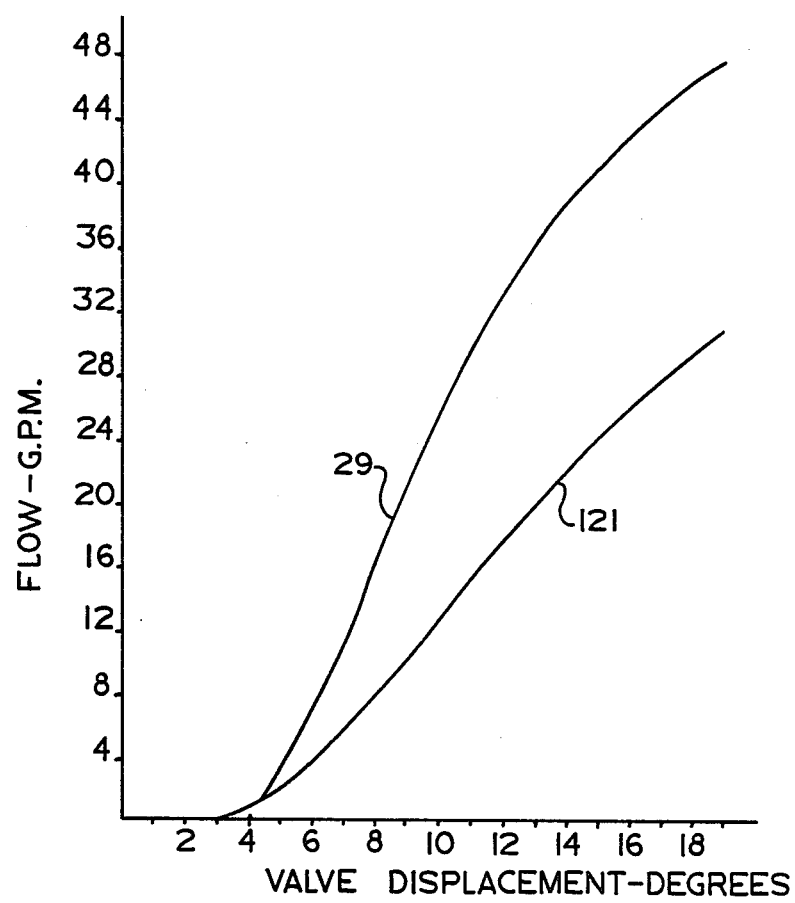
FIG. 9 is a graph of flow versus valve displacement for various fluid flows within the controller of the present invention.

A more detailed description of the operation of the invention will now be provided. Referring primarily to FIGS. 5–7 in conjunction with the graph of FIG. 9, it should be noted that in each of FIGS. 5–7, there is included an indication of the number of degrees of relative rotation between the spool 65 and sleeve 67. It will be understood by those skilled in the art that the particular displacements illustrated, as well as the shape of each of the "gain" curves in FIG. 9 is by way of example only, and the invention is not limited to any particular shape of gain curve, nor to any particular relationship between valve displacement and opening and closing of the various orifices.

Referring now to FIG. 5, the spool 65 has been displaced by about 3 degrees relative to the sleeve 67, and each of the pressure ports 103 is just beginning to communicate with its respective pressure passage 113L. Therefore, the main variable flow control orifice 121 is just beginning to open as may be seen in the graph of FIG. 9 (flow curve labeled "121"). At this particular valve displacement, communication between the amplification bores 127 and the pressure passage 113R is still blocked, such that there is no flow through the amplification fluid path.

Referring now to FIG. 6, the spool 65 has been displaced by about 4 degrees relative to the sleeve 67. At this particular valve displacement, there is substantial communication between the pressure ports 103 and the pressure passages 113L (i.e., through the main variable flow control orifice 121), and at the same time, the amplification bores 127 are just beginning to communicate with the pressure passages 113R. As the variable amplification orifice 129 begins to open at 4 degrees of displacement, the total flow out of control port 29 (flow curve labeled "29") begins to exceed the flow through the main variable flow control orifice 121.

Referring now to FIG. 7, as the displacement of the spool 65, relative to sleeve 67 is further increased, the amplification bores 127 are in full communication with the pressures passages 113R.

As may be seen in the graph of FIG. 9, when the valving is displaced by 12 degrees, the flow through the main variable orifice 121 is approximately 18 gpm, and the total flow is 34 gpm. Therefore, in the subject embodiment, after the variable amplification orifice 129 is fully open as in FIG. 7, the flow through the amplification fluid path is approximately 16 gpm. As the valving is further displaced, the amplification flow will continue to be 16 gpm, although the flow through the main fluid path continues to increase, and therefore the total flow ("29") also increases. For example, when the valving is fully displaced at 19 degrees, the flow through the orifice 121 is 32 gpm and the total steering flow is 48 gpm.

AMPLIFICATION RATIO

It will be understood by those skilled in the art that if the amplification bores 127 were replaced by a bore having the same size and shape as the pressure ports 103, and having the same spacing, with respect to the pressure passages 113L and 113R, then the amplification flow would be approximately equal to the flow through the main fluid path. Therefore, the total steering flow (flow curve 29) would be exactly double the flow through the main fluid path (flow curve 121) at any given valving displacement. The result would be an amplification ratio (i.e., ratio of total flow 29 to main fluid path flow 121) of 2:1, over the entire range of valve displacements. Although such a constant 2:1 ratio may be desirable in certain vehicle applications, in the subject embodiment, the amplification bores 127 were selected to satisfy several performance criterion which will be described subsequently.

Figure 10:
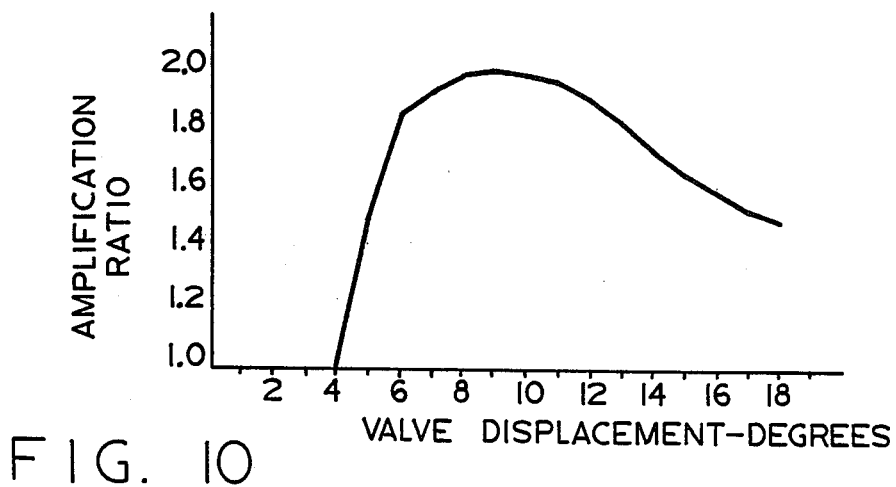
FIG. 10 is a graph of amplification ratio versus valve displacement, corresponding to the flow graph of FIG. 9.

Referring now to the graph of amplification ratio versus valve displacement in FIG. 10, in conjunction with FIGS. 5–7, the following performance characteristics should be noted:

(1) Because the pressure ports 103 begin to open at 3 degrees but the amplification bores 127 do not open until 4 degrees, minor steering corrections can be made without any amplification flow (i.e., amplification ratio equal to 1.0), such that the steering is not overly responsive at small wheel deflections;

(2) The amplification flow reaches its maximum at 12 degrees of valve displacement, such that the amplification ratio is at its peak (between 1.9 and 2.0) for valve displacements between about 8 degrees and 12 degrees, corresponding to typical steering action; and (3) Because the amplification flow does not continue to increase after about 12 degrees of valve displacement, but the flow through the main fluid path (flow curve 121) does continue to increase, the amplification ratio gradually decreases as the valve displacement moves toward the maximum, thus avoiding overly responsive steering at high steering inputs.

FIG. 8 EMOBODIMENT

Figure 8:
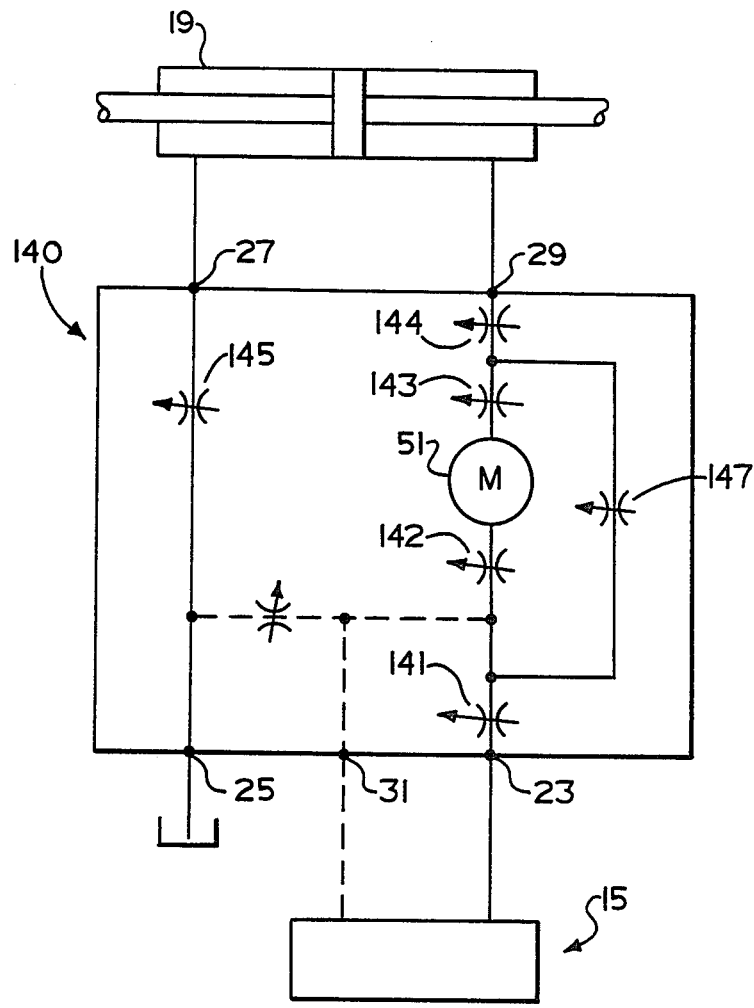
FIG. 8 is a flow diagram, similar to FIG. 3, illustrating an alternative embodiment of the present invention.

Referring now to FIG. 8, there is illustrated schematically an alternative embodiment of the present invention in a flow diagram similar to FIG. 3. The embodiment of FIG. 8 differs from that of FIG. 3 in several ways.

First, the controller 17 of FIG. 3 is of the type described in U.S. Pat. No. 4,109,679, in which the spool and sleeve define only three variable flow control orifices (121; 123; and 125). The embodiment of FIG. 8 includes a controller 140 of the type described in U.S. Pat. No. Re. 25,126 in which the spool and sleeve define a main variable flow control orifice 141 ($A_1$); variable flow control orifices 142 ($A_2$) and 143 ($A_3$), immediately upstream and downstream of the fluid meter 51, respectively; a variable flow control orifice 144 ($A_4$) upstream of the control port 29; and a variable flow control orifice 145 ($A_5$) downstream of the control fluid port 27 on the return side.

Secondly, in the embodiment of FIG. 3, the amplification fluid path communicates with the main fluid path upstream of the main variable flow control orifice 121. In the embodiment of FIG. 8, partly because there are variable flow control orifices 142 and 143 on either side of the fluid meter 51, the amplification fluid path communicates with the main fluid path downstream of the main variable flow control orifice 141. Therefore, in the embodiment of FIG. 8, the variable orifices 141 and 144 must be sized for the entire steering flow.

The invention has been described in great detail in the foregoing specification, and it is believed that various alterations and modifications of the invention will become apparent to those skilled in the art from a reading and understanding of this specification. It is intended that all such alterations and modifications are included in the invention, insofar as they come within the scope of the appended claims.

I claim:

1. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position and a first operating position; said housing means and said valve means cooperating to define a main fluid path communicating between said inlet port and said first control fluid port, and between said second control fluid port and said return port when said valve mean is in said first operating position; fluid actuated means for imparting follow-up movement to said valve means proportional to the volume of fluid flow through said fluid actuated means, said fluid actuated means being disposed in series flow relationship in said main fluid path between said inlet port and said first control fluid port; said main fluid path including a first variable flow control orifice disposed between said inlet port and said fluid actuated means, and having its minimum flow area when said valve means is in said neutral position, and an increasing flow area as said valve means is displaced from said neutral position toward said first operating position; said main fluid path including a second variable flow control orifice disposed between said fluid actuated means and said first control fluid port; characterized by:
    (a) said housing means and said valve means cooperating to define an amplification fluid path, in parallel with said main fluid path, said amplification fluid path being in fluid communication with said main fluid path at a first location disposed between said fluid inlet port and said first variable flow control orifice, and at a second location disposed between said fluid actuated means and said first control fluid port;
    (b) said amplification fluid path including a variable amplification orifice having its minimum flow area when said valve means is in said neutral position, and an increasing flow area as said valve means is displaced from said neutral position toward said first operating position; and
    (c) said main variable flow control orifice begins to open at least as soon as said variable amplification orifice, as said valve means moves from said neutral position toward said first operating position.

2. A controller a claimed in claim 1 characterized by said valve means comprising a primary, rotatable valve member and a cooperating, relatively rotatable valve member, said primary and follow-up valve members defining said neutral position relative to each other.

3. A controller as claimed in claim 2 characterized by said primary and follow-up valve members cooperating to define said first and second variable flow control orifices, the flow areas of said variable orifices varying in response to relative rotation of said primary and follow-up valve members.

4. A controller as claimed in claim 2 characterized by said amplification fluid path and said variable amplification orifice being wholly defined by said primary and follow-up valve members.

5. A controller as claimed in claim 1 characterized by said amplification fluid path being in fluid communication with said main fluid path at a second location disposed between said fluid actuated means and said second variable flow control orifice.

6. A controller as claimed in claim 1 characterized by said first variable flow control orifice and said variable amplification orifice begin to open at approximately the same amount of displacement of said valve means from said neutral position.

7. A controller as claimed in claim 1 characterized by said first variable flow control orifice begins to open before said variable amplification orifice begins to open as said valve means moves from said neutral position toward said operating position.

8. A controller as claimed in claim 2 characterized by said fluid actuated means comprises a fluid meter including a metering member movable to measure the volume of fluid flowing through said main variable flow control orifice, said controller further comprising means coupling said metering member to said follow-up valve member.

9. A controller as claimed in claim 1 characterized by said variable amplification orifice begins to decrease its amplification ratio before said first variable flow control orifice reaches a maximum flow area, as said valve means moves from said neutral position toward a maximum displacement position.

10. A controller as claimed in claim 1 characterized by the source of pressurized fluid including a fluid pump and pressure responsive means for varying the delivery of fluid to said controller in response to variations in demand for fluid by said controller, said housing means of said controller defining a load signal port for connection to the pressure responsive means, said load signal port being in fluid communication with said main fluid path at a location disposed downstream of said first variable flow control orifice.

11. A controller as claimed in claim 10 characterized by the pressure responsive means comprising a priority flow control valve disposed in series flow relation between the pump and said controller, the priority flow control valve including an inlet port in fluid communication with the pump, a priority outlet port in fluid communication with the inlet port of said controller, an excess flow outlet port adapted for fluid communication with an auxiliary load circuit, and a priority valve member movable between one position permitting substantially unrestricted fluid communication from said inlet port of said priority valve to said priority outlet port, and another position permitting substantially unrestricted fluid communication from said inlet port to said excess flow outlet port, means biasing said priority valve member toward said one position, said biasing means including means providing fluid communication with said load signal port of said controller.

12. A controller operable to control the flow of fluid from a source of pressurized fluid to a fluid pressure operated device; said controller being of the type including housing means defining an inlet port for connection to the source of pressurized fluid, a return port for connection to a reservoir, and first and second control fluid ports for connection to the fluid pressure operated device; valve means disposed in said housing means and defining a neutral position and a first operating position; said housing means and said valve means cooperating to define a main fluid path communicating between said inlet port and said first control fluid port, and between said second control fluid port and said return port when said valve mean is in said first operating position; fluid actuated means for imparting follow-up movement to said valve means proportional to the volume of fluid flow through said fluid actuated means said fluid actuated means being disposed in series flow relationship in said main fluid path between said inlet port and said first control fluid port; said main fluid path including first and second variable flow control orifices disposed in series flow relationship between said inlet port and said fluid actuated means, each having its minimum flow area when said valve means is in said neutral position, and an increasing flow area as said valve means is displaced from said neutral position toward said first operating position; said main fluid path including third and fourth variable flow control orifices disposed between said fluid actuated means and said first control fluid port; characterized by:

(a) said housing means and said valve means cooperating to define an amplification fluid path, in parallel with said main fluid path, said amplification fluid path being in fluid communication with said main fluid path at a first location disposed between said first and second variable flow control orifices, and at a second location disposed between said fluid actuated means and said first control fluid port;

(b) said amplification fluid path including a variable amplification orifice having its minimum flow area when said valve means is in said neutral position, and an increasing flow area as said valve means is displaced from said neutral position toward said first operating position; and (c) said main variable flow control orifice begins to open at least as soon as said variable amplification orifice, as said valve means moves from said neutral position toward said first operating position.

13. A controller as claimed in claim 12 characterized by said amplification fluid path being in fluid communication with said main fluid path at a second location disposed between said third and fourth variable flow control orifices.

14. A controller a claimed in claim 12 characterized by said valve means comprising a primary, rotatable valve member and a cooperating, relatively rotatable valve member, said primary and follow-up valve members defining said neutral position relative to each other.

15. A controller as claimed in claim 14 characterized by said primary and follow-up valve members cooperating to define said first and second variable flow control orifices, the flow areas of said variable orifices varying in response to relative rotation of said primary and follow-up valve members.

16. A controller as claimed in claim 14 characterized by said amplification fluid path and said variable amplification orifice being wholly defined by said primary and follow-up valve members.

17. A controller as claimed in claim 12 characterized by said first variable flow control orifice and said variable amplification orifice begin to open at approximately the same amount of displacement of said valve means from said neutral position.

18. A controller as claimed in claim 12 characterized by said first variable flow control orifice begins to open before said variable amplification orifice begins to open as said valve means moves from said neutral position toward said operating position.

* * * * *